(12) United States Patent
Ogushi

(10) Patent No.: US 11,272,112 B2
(45) Date of Patent: Mar. 8, 2022

(54) IMAGE CAPTURING APPARATUS

(71) Applicant: CANON KABUSHIKI KAISHA, Tokyo (JP)

(72) Inventor: Naoto Ogushi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/531,733

(22) Filed: Aug. 5, 2019

(65) Prior Publication Data

US 2020/0053266 A1 Feb. 13, 2020

(30) Foreign Application Priority Data

Aug. 8, 2018 (JP) .............................. JP2018-149678
Jun. 26, 2019 (JP) .............................. JP2019-119015

(51) Int. Cl.
| | |
|---|---|
| *H04N 5/235* | (2006.01) |
| *G02B 7/198* | (2021.01) |
| *G03B 17/17* | (2021.01) |
| *H04N 5/225* | (2006.01) |
| *H04N 5/232* | (2006.01) |
| *H04N 9/04* | (2006.01) |
| *H04N 9/097* | (2006.01) |
| *G02B 7/182* | (2021.01) |
| *G03B 7/091* | (2021.01) |
| *G03B 17/46* | (2021.01) |
| *G03B 19/02* | (2021.01) |

(Continued)

(52) U.S. Cl.
CPC ............ *H04N 5/2351* (2013.01); *G02B 7/198* (2013.01); *G03B 17/17* (2013.01); *H04N 5/2254* (2013.01); *H04N 5/2258* (2013.01); *H04N 5/2355* (2013.01); *H04N 5/23245* (2013.01); *H04N 9/045* (2013.01); *H04N 9/097* (2013.01)

(58) Field of Classification Search
CPC ............... H04N 5/2351; H04N 5/2258; H04N 5/23245; H04N 9/045; H04N 5/2254; H04N 5/2355; H04N 9/097; H04N 5/243; H04N 5/247; H04N 5/232411; H04N 5/232; H04N 5/374; G02B 7/198; G02B 7/1827; G03B 17/17; G03B 7/091; G03B 19/023; G03B 17/46; G03B 19/12; H01L 31/107; H01L 31/02027
See application file for complete search history.

(56) References Cited

U.S. PATENT DOCUMENTS 10,120,066 B2 * 11/2018 Yang ...................... H04N 13/25
2010/0328432 A1 * 12/2010 Tanaka .................. H04N 13/156
348/46

(Continued)

FOREIGN PATENT DOCUMENTS

JP 2014-081253 A 5/2014

*Primary Examiner* — Albert H Cutler
(74) *Attorney, Agent, or Firm* — Cowan, Liebowitz & Latman, P.C.

(57) ABSTRACT

An image capturing apparatus comprises: a first image sensor having a plurality of pixels each counts a number of entering photons and outputs a count value as a first image signal; a second image sensor having a plurality of pixels each outputs an electric signal corresponding to a charge amount obtained by performing photoelectric conversion on entering light as a second image signal; and a generator that generates an image by selecting one of the first image signal and the second image signal.

6 Claims, 14 Drawing Sheets

(51) Int. Cl.
*H04N 5/243* (2006.01)
*H04N 5/247* (2006.01)
*H04N 5/374* (2011.01)

(56) References Cited

U.S. PATENT DOCUMENTS

2013/0108183 A1* 5/2013 Bruls .................. H04N 19/593
 382/233
2016/0117860 A1* 4/2016 Fei ...................... G06F 3/04815
 345/419
2017/0351336 A1* 12/2017 Yang ..................... G06F 3/017
2020/0326414 A1* 10/2020 Delic .................... G01S 17/894

* cited by examiner

F I G. 4A
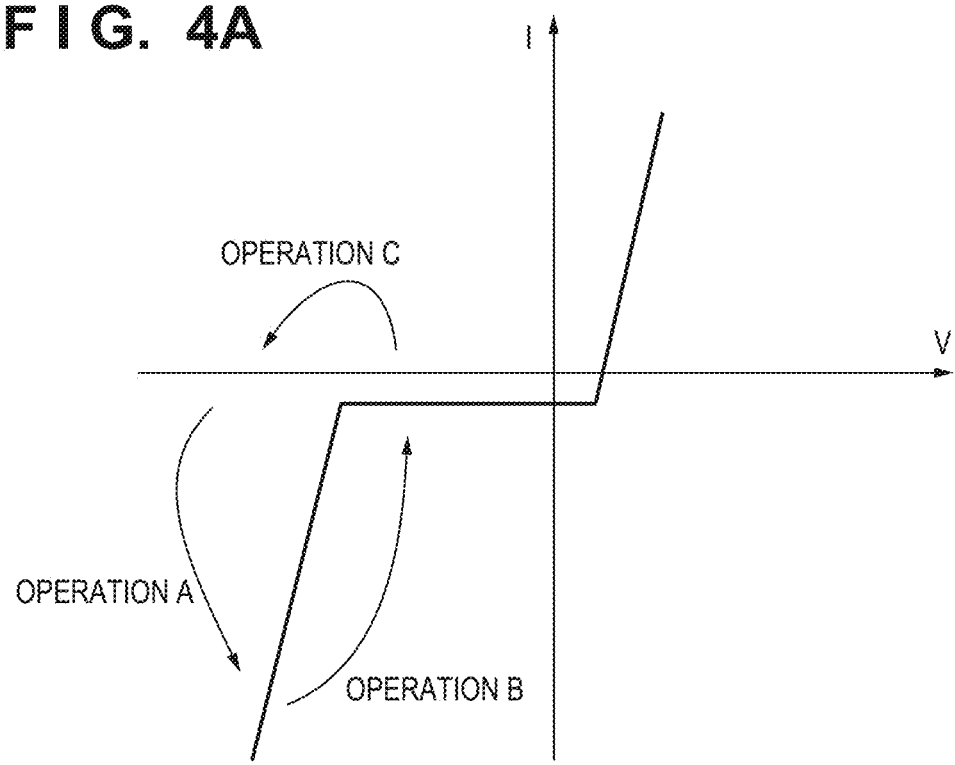
F I G. 4B
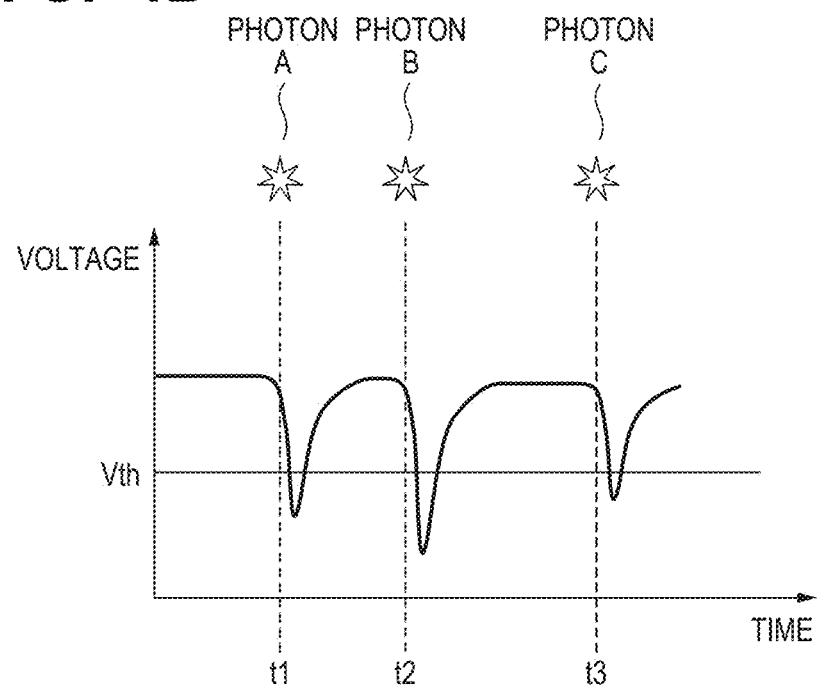

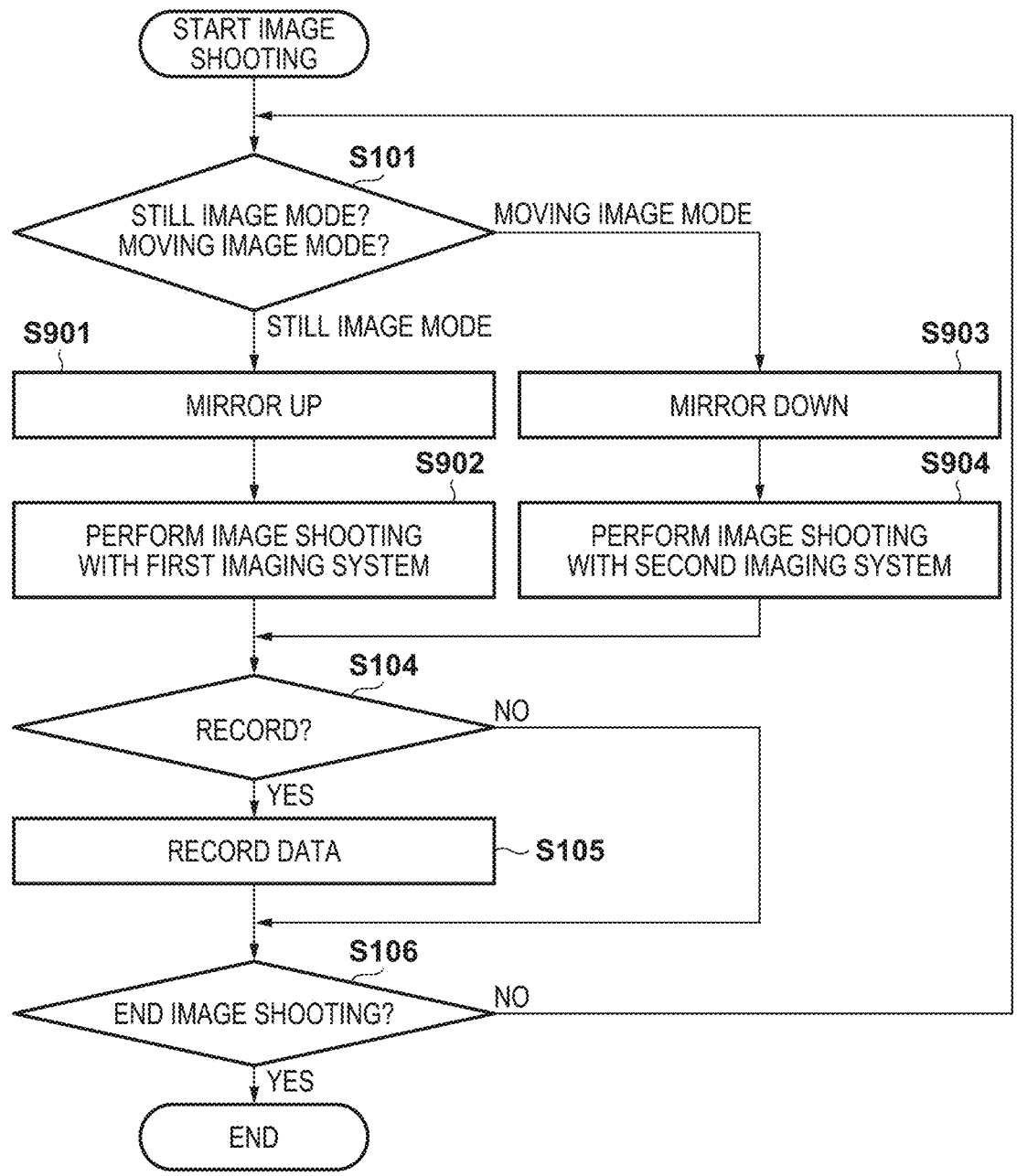

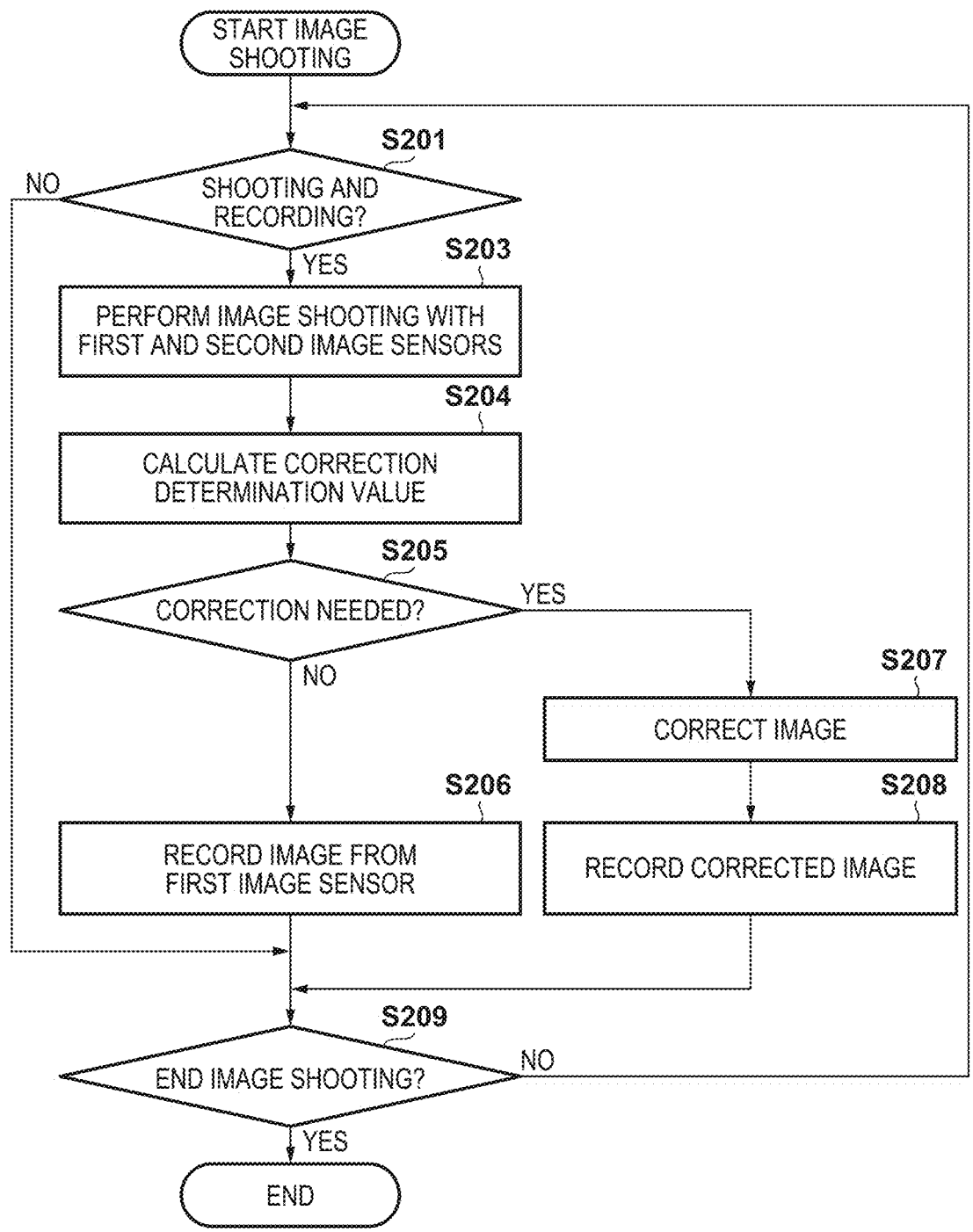

IMAGE CAPTURING APPARATUS

BACKGROUND OF THE INVENTION

Field of the Invention

The present invention relates to an image capturing apparatus provided with an imaging device employing an avalanche photodiode.

Description of the Related Art

Image sensors using a charge accumulation method is generally used in conventional digital cameras, video cameras, the like. The charge accumulation method is a method in which light incident on a photodiode (PD) in a fixed period is captured as an analog quantity called a voltage value.

With the charge accumulation method, when light is incident on a PD of each pixel, the PD generates and accumulates a charge substantially linearly with respect to an amount of incident light. The charge accumulated in the PD is transferred to a floating diffusion (FD) unit, converted into a voltage, and amplified by a source-follower (SF). The voltage output from each pixel is converted into a digital signal by an AD converter, and output to the exterior.

With the charge accumulation method, it is known that when, for example, the voltage in the FD is amplified by the SF, the S/N ratio drops due to Random Telegraph Signal (RTS) noise produced at the boundary of the SF gate.

Meanwhile, recent years have seen investigations into photon counting type image sensor that use an avalanche phenomenon occurring when avalanche photodiodes (APDs) are operated in Geiger mode to measure the number of incoming photons themselves, and thus is capable of handling entering light as digital value.

When an APD is operated in Geiger mode, an observable current is produced by the avalanche phenomenon when a single photon enters the APD, for example. By converting the current into a pulse signal and counting the number of pulse signals, the number of incoming photons can be measured directly. As such, an improvement in the S/N ratio can be anticipated, without producing RTS noise. Japanese Patent Laid-Open No. 2014-81253 discloses a distance-measurement sensor constituted by the APDs of a plurality of pixels as an example of a sensing device employing APDs.

In Geiger mode, since an avalanche phenomenon can be caused even by incidence of a single photon, it is also called Single Photon Avalanche Diode (SPAD).

Since it is necessary to apply a high electric field higher than the breakdown voltage in order to operate the APD in Geiger mode and a large current flows due to the avalanche phenomenon when photons are incident, a large power consumption has been a problem.

In addition, when shooting a high-brightness subject, a plurality of photons are incident in a short time (dead time) period such that a photon is incident during an avalanche phenomenon caused by another photon is in progress, and there is a problem that photons cannot be counted appropriately.

SUMMARY OF THE INVENTION

The present invention has been made in consideration of the above situation, and improves image quality by taking advantage of a photon counting type image sensor, such as SPAD, and a charge accumulation type image sensor, such as CMOS sensor.

According to the present invention, provided is an image capturing apparatus comprising: a first image sensor having a plurality of pixels each counts a number of entering photons and outputs a count value as a first image signal; a second image sensor having a plurality of pixels each outputs an electric signal corresponding to a charge amount obtained by performing photoelectric conversion on entering light as a second image signal; and a generator that generates an image by selecting one of the first image signal and the second image signal.

Further, according to the present invention, provided is an image capturing apparatus comprising: an image sensor in which a plurality of first pixels and a plurality of second pixels are arranged alternately, whereby each of the first pixels counts a number of entering photons and outputs a count value as a first image signal and each of the second pixels outputs an electric signal corresponding to a charge amount obtained by performing photoelectric conversion on entering light as a second image signal; a generator that generates an image by selecting one of the first image signal and the second image signal; and an obtaining unit that obtaining a luminance value for each pixel, wherein the generator includes a dynamic range expander that expands a dynamic range using the first image signal and the second image signal, and the dynamic range expander performs, for each pixel, processing of selecting the first image signal in a case where the luminance value is less than a predetermined first threshold value, selecting and synthesizing the first and second image signals in a case where the luminance value is equal to or greater than the first threshold value and less than a predetermined second threshold value which is larger than the first threshold value, and selecting the second image signal and adjusting its sensitivity in a case where the luminance value is equal to or greater than the second threshold value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A and 4B are diagrams for explaining a principle of operation of the SPAD-type image sensor according to the embodiment;

FIG. 9 is a flowchart for explaining an image shooting operation according to the modification of the first embodiment;

FIG. 12 is a flowchart for explaining an image shooting operation according to a second embodiment;

DESCRIPTION OF THE EMBODIMENTS

Exemplary embodiments of the present invention will be described in detail in accordance with the accompanying drawings.

First Embodiment

A first embodiment of the present invention will be described with reference to FIGS. 1A to 6. The image capturing apparatus of the present embodiment is applicable to an electronic still camera with a moving image function, a video camera, and the like.

Figure 1A:
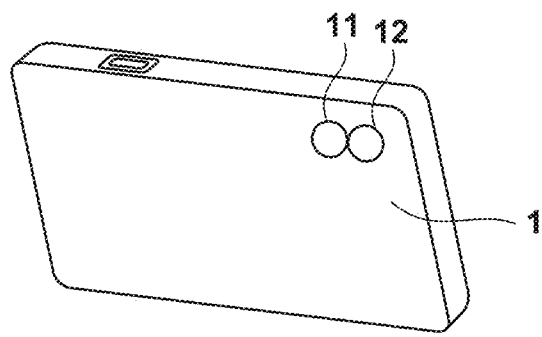
FIG. 1A is a diagram showing examples of an appearance of an image capturing apparatus.

FIG. 1A is a view showing an example of an appearance of the image capturing apparatus according to an embodiment of the present invention. As shown in FIG. 1A, the image capturing apparatus 1 of the present embodiment has two optical units, a first imaging system 11 and a second imaging system 12.

Figure 2:
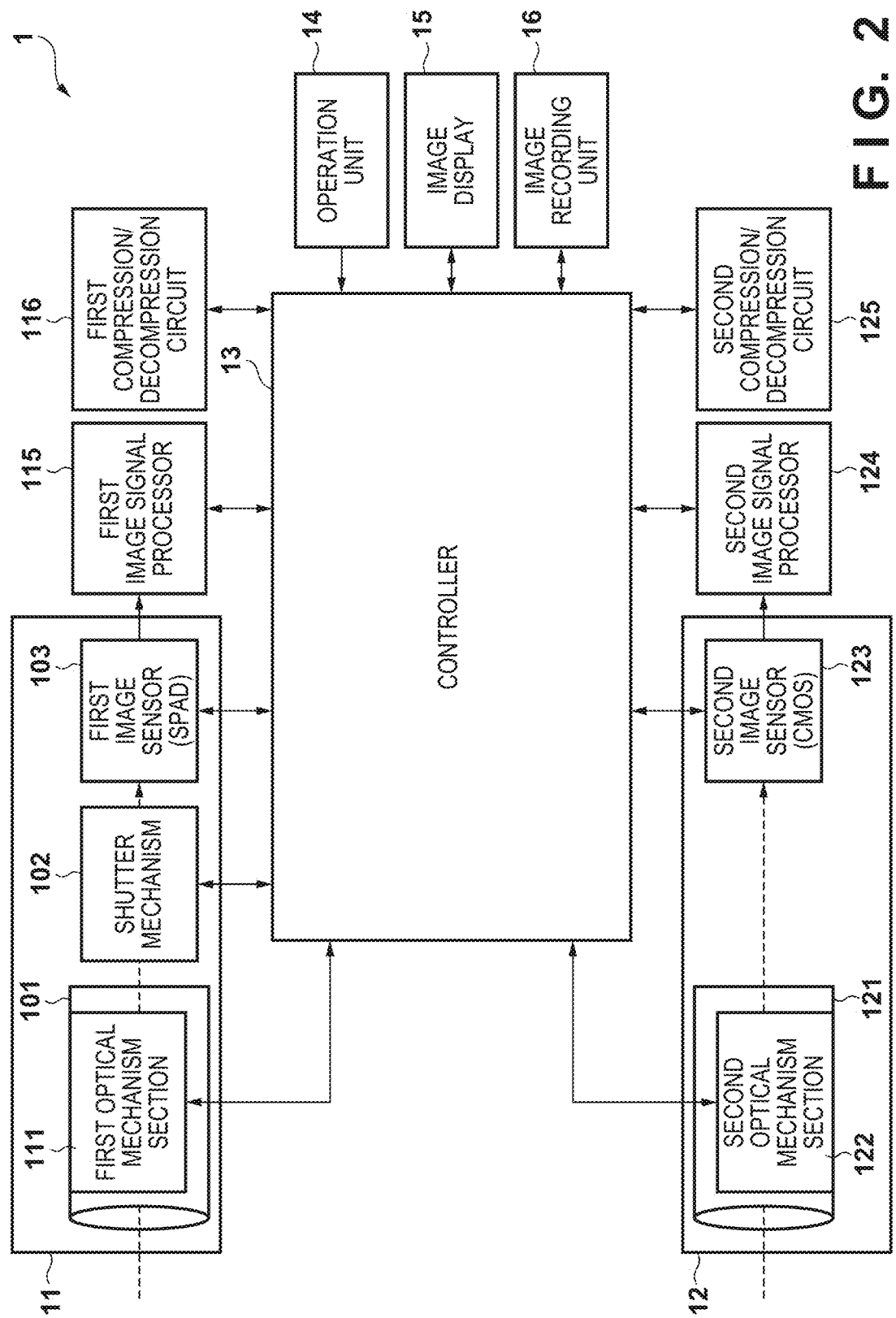
FIG. 2 is a block diagram showing a configuration of the image capturing apparatus according to the embodiment.

FIG. 2 is a block diagram showing a configuration of the image capturing apparatus 1. The capturing apparatus 1 includes the first imaging system 11, a first image signal processor 115, a first compression/decompression circuit 116, the second imaging system 12, a second image signal processor 124, and a second compression/decompression circuit 125. Furthermore, a controller 13, an operation unit 14, an image display 15, and an image recording unit 16 are provided.

The first imaging system 11 includes a first optical lens barrel 101 (first imaging optical system), a shutter mechanism 102, and a first image sensor 103. The first optical lens barrel 101 includes a lens for converging light from a subject onto the first image sensor 103, and a first optical mechanism section 111 provided with an optical mechanism for performing focus adjustment, changing optical magnification, and adjusting an amount of light with respect to the converged light.

The first optical mechanism section 111 is driven based on a control signal from the controller 13. The shutter mechanism 102 is configured between the first optical lens barrel 101 and the first image sensor 103, and controls an exposure time for exposing the first image sensor 103 with light passing through the first optical lens barrel 101 according to the control signal from the controller 13.

The first image sensor 103 is a SPAT/type imaging device comprising of pixels using APD, and an image shooting operation is performed according to the control signal from the controller 13, and an image signal which is a count value of the number of incident photons is output. The configuration of the first image sensor 103 will be described later.

The first image signal processor 115 performs image processing, such as color correction processing, AE (Auto Exposure) processing, white balance processing, and optical shading correction processing on the image signal from the first image sensor 103 under the control of the controller 13. After performing the image processing, the first image signal processor 115 outputs an image signal and a control signal to the controller 13. The image signal and control signal output from the first image signal processor 115 are recorded in a RAM (not shown) configured in the controller 13.

The first compression/decompression circuit 116 operates under the control of the controller 13 and compresses and encodes the image signals recorded in the RAM in the controller 13 from the first image signal processor 115 in a predetermined data format such as MEG. Also, the first compression/decompression circuit 116 decompresses and decodes encoded data of the still image supplied from the controller 13 is. Furthermore, the first compression/decompression circuit 116 may be configured such that the compression encoding/decompression decoding of a moving image may be executable using the MPEG (Moving Picture Experts Group) method or the like.

The second imaging system 12 is configured of a second optical lens barrel 121 (second imaging optical system) and a second image sensor 123. The second optical lens barrel 121 has a configuration similar to that of the first optical lens barrel 101, and a second optical mechanism section 122 performs optical control in response to a control signal from the controller 13.

The second image sensor 123 is a CMOS-type image sensor, and reads out an image signal from CMOS pixels to be described later by an XY readout method, and outputs the image signal according to a control signal from the controller 13.

The second image signal processor 124 performs image processing similar to the image processing performed on the first image signal processor 115 on the image signal from the second image sensor 123, and outputs the image signal and a control signal to the controller 13. The image signal and control signal output from the second image signal processor 124 are recorded in the RAM (not shown configured in the controller 13.

The second compression/decompression circuit 125 performs processing similar to the processing performed on the first compression/decompression circuit 116 on the image signal processed by the second image signal processor 124.

In the present embodiment, the first image signal processor 115 and the second image signal processor 124, and the first compression/decompression circuit 116 and the second compression/decompression circuit 125 will be described separately. However, the present invention is not limited to this, and a single imaging signal processor and a single compression/decompression circuit may be used to process image signals obtained from the first imaging system 11 and the second imaging system 12.

The controller 13 is, for example, a microcontroller including a CPU, a ROM, a RAM, and the like, and centrally controls the components of the image capturing apparatus 1 by executing a program stored in the ROM and the like.

The operation unit 14 includes, for example, various operation keys such as a shutter release button, a lever, a dial, and the like, and outputs a control signal to the controller 13 according to an input operation by the user. The image display 15 is composed of a display device such as an LCD and an interface circuit to this, generates an image signal to be displayed on the display device from the image signal supplied from the controller 13, and supplies this signal to the display device to display the image.

The image recording unit 16 receives an image data file encoded by the first compression/decompression circuit 116 or the second compression/decompression circuit 125 from the controller 13, and records the image data file in, for example, a portable semiconductor memory, an optical disk, an HDD, a magnetic tape or other storage medium, and the like. Also, the image recording unit 16 reads out data specified based on the control signal from the controller 13 from the storage medium and outputs the data to the controller 13.

Figure 1B:
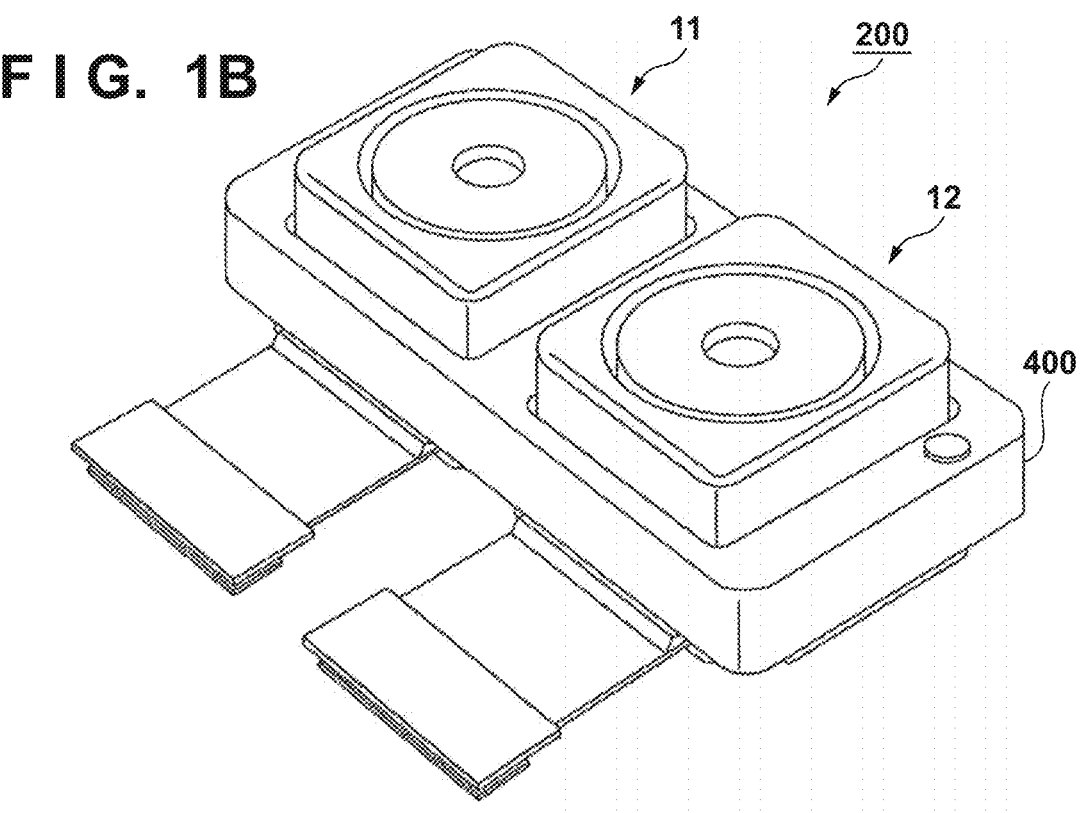
FIGS. 1B and 1C are a perspective view and a front view showing examples of appearances of a camera module according to an embodiment the present invention.
Figure 1C:
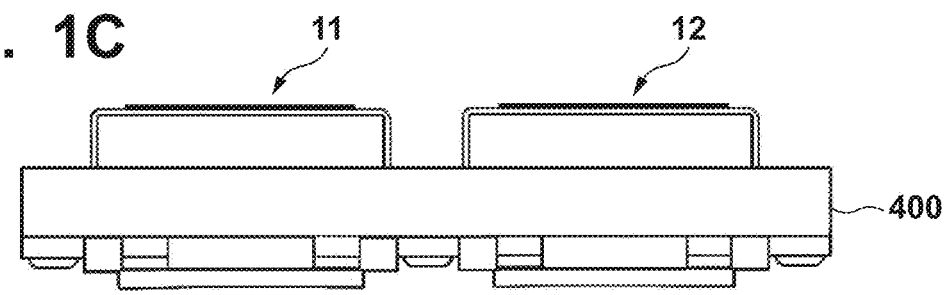

FIGS. 1B and 1C are diagrams showing configuration examples of the appearance of a camera module provided with an imaging system that can be used for the image capturing apparatus 1 of the present embodiment. FIG. 1B is a perspective view of the camera module 200, and FIG. 1C is a front view of the camera module 200.

The camera module in the present embodiment is a camera module in which two image sensors are mounted by connecting two imaging systems. A module may be called by another name such as a package.

The camera module 200 is configured by fixing the first imaging system 11 and the second imaging system 12 by a connecting member 400 having a rectangular plate shape. In the first imaging system 11, the first optical lens barrel 101 (lens unit) including the first optical mechanism section 111, the shutter mechanism 102, the first image sensor 103, and so forth, are mounted. Similar to the first imaging system 11, the second imaging system 12 includes the second optical lens barrel 121 (lens unit) including the second optical mechanism section 122, the second image sensor 123, and the like.

The connecting member 400 has a rectangular plate shape whose contour is larger than the size in the planar direction when the lens unit of the first imaging system 11 and the lens unit of the second imaging system 12 are placed side by side. Further, in the connecting member 400, a rectangular insertion hole into which the lens unit of the first imaging system 11 is inserted and a rectangular insertion hole into which the lens unit of the second imaging system 12 is inserted are formed symmetrically. The lens unit of the first imaging system 11 and the lens unit of the second imaging system 12 are respectively inserted and fixed in the two rectangular insertion holes formed through the connecting member 400.

Figure 3A:
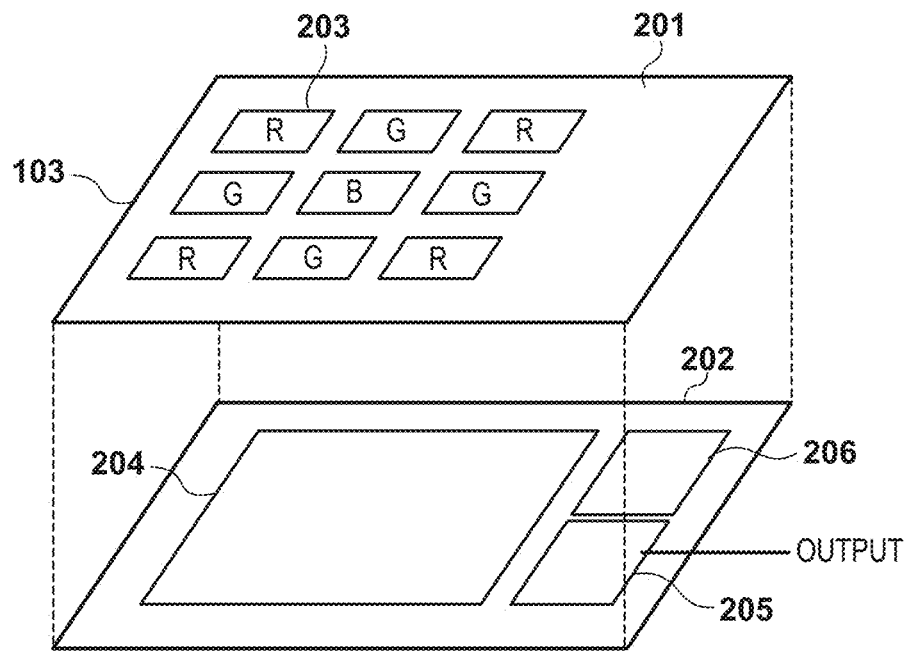
FIGS. 3A and 3B are diagrams showing a configuration of a SPAD-type image sensor and a circuit configuration of a pixel according to the embodiment.

Next, with reference to FIGS. 3A and 3B, the configuration of a SPAD-type image sensor used as the first image sensor 103 and the circuit configuration of the pixel will be described. As shown in FIG. 3A, the first image sensor 103 has a stacked structure including a sensor substrate 201 and a circuit substrate 202. In addition, although the image sensor shall have a stacked structure in this embodiment, the present invention is not limited to this, and a single layer structure may be used as long as it has the same function.

The sensor substrate 201 is formed with a pixel array in which a plurality of pixels 203 are arranged in matrix, and a Bayer color filter array of R (red), G (green) and B (blue), for example, is arranged on the respective pixels 203.

In the circuit substrate 202, a pixel control circuit 204, a signal processing circuit 205, and a substrate memory 206 are formed. The pixel control circuit 204 is electrically connected to each pixel 203 in the sensor substrate 201 by a bump or the like, outputs a control signal for driving the pixel 203, and receives a pulse waveform which is a buffer output from the pixel 203.

The pixel control circuit 204 is provided with a counter for determining the presence/absence of a photon by comparing a threshold value firth set in advance and the output of each pixel 203 and counting the number of incident photons by counting the number of pulse waveforms which changes over the threshold value.

Count values counted by the pixel control circuit 204 are output to the outside of the first image sensor 103 by the signal processing circuit 205. The substrate memory 206 is a volatile memory such as a DRAM, and is used to temporarily hold data when processing a signal from the pixel control circuit 204 with the signal processing circuit 205.

Next, the configuration of the pixel 203 will be described. FIG. 3B is an equivalent circuit diagram of the pixel 203 formed in the sensor substrate 201. The pixel 203 includes a quenching resistor 301, an avalanche photodiode (APD) 302 (light receiving element), and a buffer 303.

A reverse bias voltage with a potential HVDD is applied to the APD 302 via the quenching resistor 301. The potential HVDD at this time is set such that the reverse bias voltage is equal to or higher than the breakdown voltage in order to operate the APD 302 in Geiger mode. The output of the buffer 303 is input to a counter 304 in the pixel control circuit 204.

Here, the operation of the pixel 203 at the time of photon incidence will be briefly described using FIGS. 4A and 4B.

FIG. 4A shows the current-voltage characteristics of the APD 302. In the present embodiment, the potential HVDD for applying a reverse bias voltage exceeding the breakdown voltage is applied to the cathode of the APD 302 via the quenching resistor 301, and the APD 302 is in the Geiger mode. Here, when a photon enters the APD 302, a large current (photocurrent) flows in the APD 302 due to avalanche multiplication (operation A).

At the same time as the current flows, the reverse bias voltage is lowered by the quenching resistor 301, the reverse bias voltage applied to the APD 302 becomes less than the breakdown voltage, and the avalanche multiplication stops (operation B). When the avalanche multiplication is stopped, the cathode of the APD 302 is again charged by the potential HVDD and returns to Geiger mode (operation C).

The voltage change at the buffer input due to operations A to C is shaped into a pulse signal by the buffer 303 and measured by the counter 304. By repeating this, it is possible to count the number of photons incident on the APD 302. In operation of the APD 302 for shooting high-brightness subjects and a moving picture, since the avalanche multiplication is repeated, power consumption due to a large current flow caused by the avalanche multiplication through the quenching resistor is an issue.

FIG. 4B is a schematic diagram showing the relationship between the pulse waveform of the output voltage due to avalanche multiplication output from the APD 302 at the time of photon incidence and a determination threshold value Vth for determining the incidence of a photon with the horizontal axis as time. FIG. 4B shows the case where the potential HVDD that can cause a reverse bias voltage sufficiently exceeding the breakdown voltage to be supplied to the APD 302 is supplied. Under this situation, the avalanche multiplication occurs such that a pulse waveform that changes over the determination threshold value Vth of the counter is generated for each of a photon A (time t1), a photon B (time t2), and a photon C (time t3) incident on the APD 302, and these pulses are separated with respect to time. Therefore, the number of photon events can be counted in the case of FIG. 4B.

Next, the configuration of the CMOS image sensor used as the second image sensor 123 and the circuit configuration of the pixel will be described with reference to FIGS. 5A and 5B.

Figure 5A:
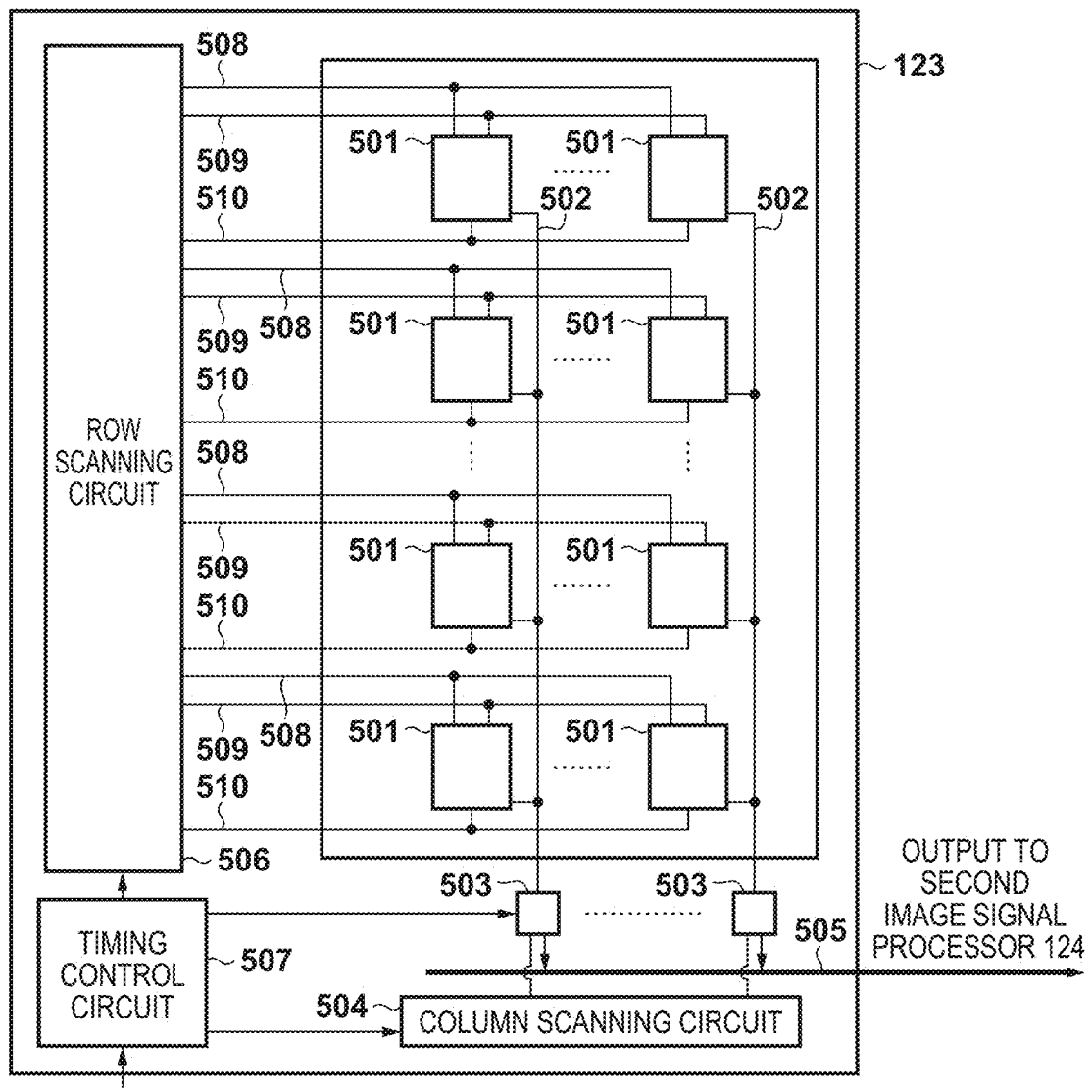
FIGS. 5A and 5B are diagrams showing the configuration of a CMOS image sensor and a circuit configuration of a pixel according to an embodiment.

FIG. 5A is a block diagram showing the configuration of a CMOS image sensor having column AD converters. As shown in FIG. 5A, the CMOS type image sensor as the second image sensor 123 has, on its light receiving surface, a plurality of pixels 501 arranged in a matrix of M rows and N columns for converting light into charges and accumulating them. Each of the plurality of pixels 501 is provided with a color filter of any of R (red), Gr, Gb (green) and B (blue) in a Bayer arrangement.

Further, column signal lines 502 for transmitting an image signal corresponding to the charge amount accumulated in each pixel 301 are formed for each column, and a column circuit 503 is connected in series for each column signal line 502.

Each column circuit 503 is comprised of an amplifier, a Correlated Double Sampling (CDS) circuit, and an analog-to-digital (AD) converter (not shown). Each AD converter converts an image signal which is an analog signal into a digital signal and outputs the digital signal, and the digital signals are sequentially output through a horizontal signal line 505 by a column scanning circuit 504 and input to the second image signal processor 124.

Further, a row scanning circuit 506 receives a timing control signal from a timing control circuit 507 that operates according to a control signal from the controller 13 and scans transfer signal lines 508, reset signal lines 509, and row selection signal lines 510. Then, the pixel signals output from respective pixels 501 are read out row by row to the column signal lines 502 of the respective columns.

Next, the configuration of the pixel 501 will be explained. FIG. 5B is an equivalent circuit diagram of the pixel 501. In the pixel 501, a photodiode PD51, a transfer transistor M52, an amplification transistor M53, a selection transistor M54, and a reset transistor M55 are provided. Here, each transistor is a switch element configured by an n-channel MOSFET.

The transfer signal line 508, the reset signal line 509, and the row selection signal line 510 are connected to the gates of the transfer transistor M52, the reset transistor M55, and the selection transistor M54, respectively. These signal lines extend in the horizontal direction to simultaneously drive the pixels 501 included in the same row, whereby a rolling shutter of line sequential operation type or a global shutter of all row simultaneous operation type is realized. Furthermore, the column signal line 502 is connected to the source of the selection transistor M54, and one end of the column signal line 502 is grounded via a constant current source 56.

The photodiode PD51 performs photoelectric conversion and accumulates the generated charge. The P side is grounded, and the N side is connected to the source of the transfer transistor M52. When the transfer transistor M52 is turned on, the charge accumulated in the photodiode PD51 is transferred to a floating diffusion portion (FD) 57. Since the FD 57 has a parasitic capacitance C58, the charge is accumulated in this portion.

The drain of the amplification transistor M53 is connected to a power supply voltage Vdd, and the gate is connected to the FD 57. The amplification transistor M53 converts the voltage of the FD 57 into an electrical signal.

The selection transistor M54 is for selecting the pixel from which the signal is read out row by row, and its drain is connected to the source of the amplification transistor M53, and its source is connected to the column signal line 502. When the selection transistor M54 is turned on, the amplification transistor M53 and the constant current source 56 constitute a source follower, so that a voltage corresponding to the voltage of the FD 57 is output to the column signal line 502.

The drain of the reset transistor M55 is connected to the power supply voltage Vdd, and the source is connected to the FD 57. The reset transistor M55 resets the photodiode PD51 to the power supply voltage Vdd via the FD 57 and the transfer transistor M52.

Figure 6:
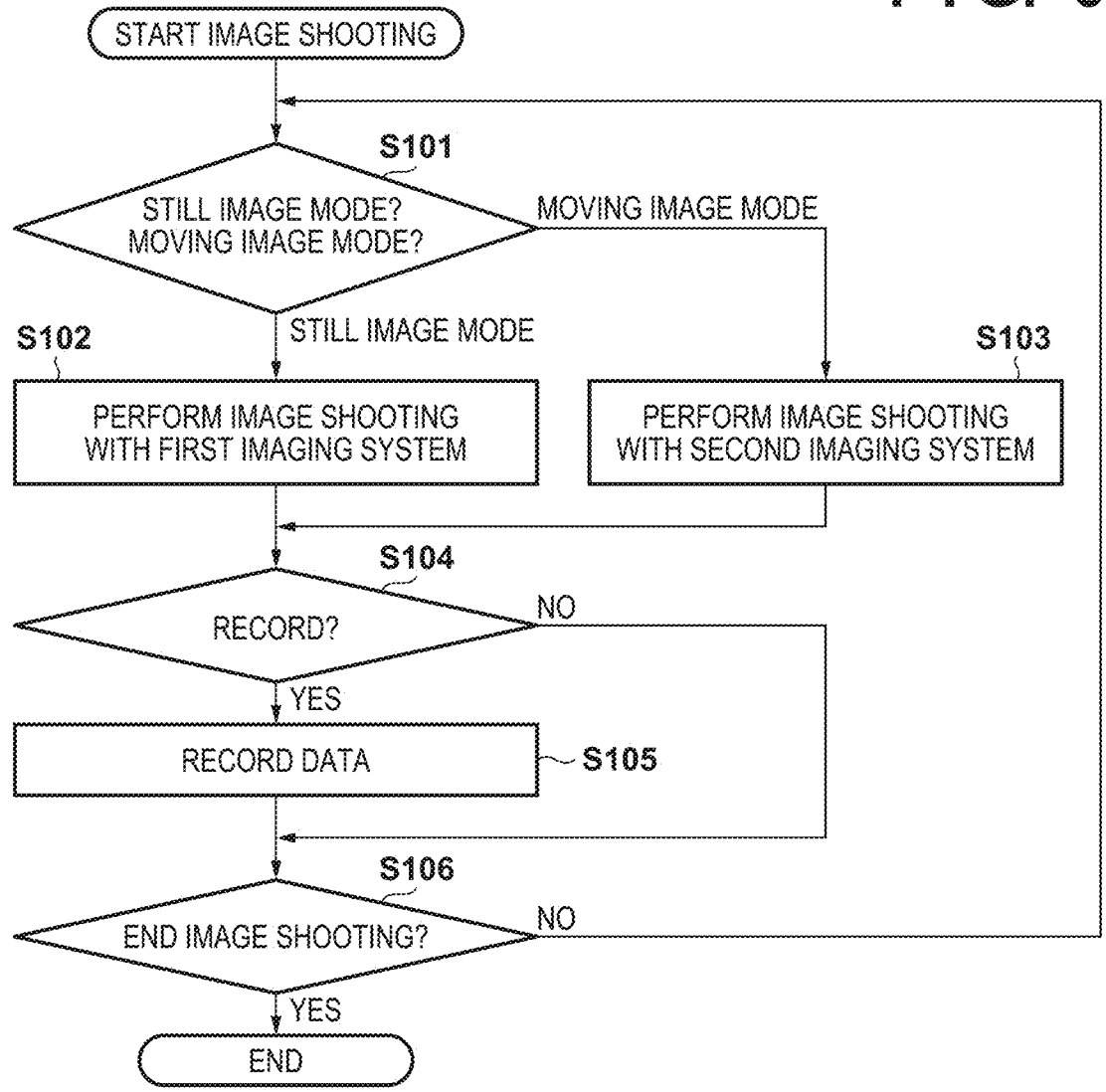
FIG. 6 is a flowchart for explaining an image shooting operation according to a first embodiment.

Next, with reference to FIG. 6, the operation flow of a still image shooting and a moving image shooting in the image capturing apparatus 1 of the present embodiment will be described.

Figure 3B:
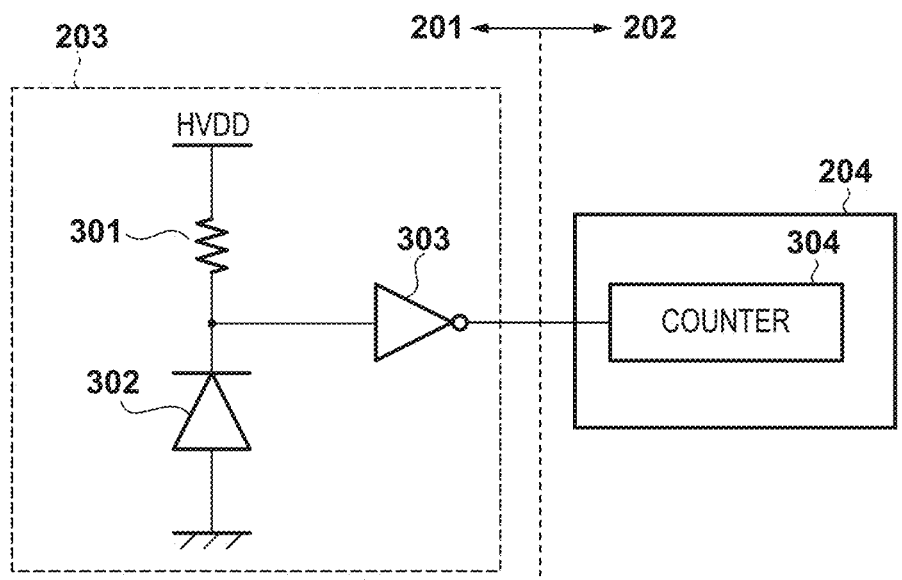
Figure 5B:
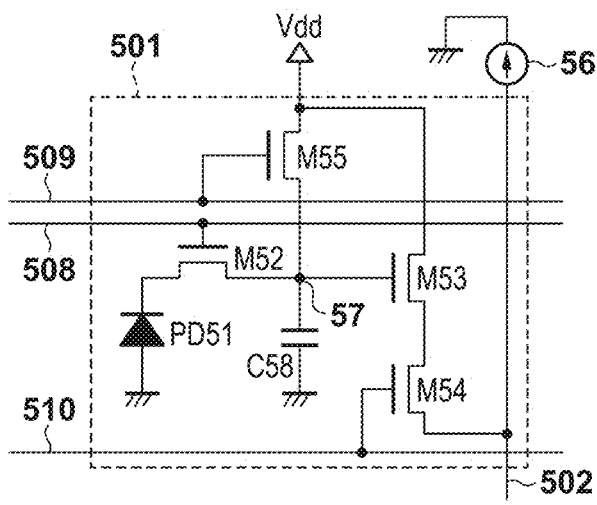

Compared to the pixels 501 of the CMOS type in the second image sensor 123 shown in FIGS. 5A and 5B, the pixels 203 of the SPAD type in first image sensor 103 shown in FIGS. 3A and 3B are not provided with the reset transistor M55 and the amplification transistor M53.

Therefore, in the first image sensor 103, kTC noise and RTS noise caused by each transistor are not generated, and the S/N ratio is excellent compared to the second image sensor 123 of the CMOS type. Accordingly, the first image sensor is advantageous to shoot a still image on which effects of random noise for the image quality is high.

On the other hand, in the case of shooting moving images and performing continuous shooting in which a large number of images are taken repeatedly, the power consumption due to large current caused by avalanche multiplication is large, and it is conceivable that the number of images that can be shot decreases when the image capturing apparatus is driven by a battery, and the operation time becomes short.

Therefore, in the first embodiment, in a case where still image shooting with the large number of pixels is selected, the SPAD type first image sensor 103 is used, and in a case where moving image shooting with high power consumption per unit time is selected, the CMOS type second image sensor 123 is used.

When power is turned on to start image shooting operation, the controller 13 first determines in step S101 whether a still image mode is selected or a moving image mode is selected by user operation to the operation unit 14 or the like if the still image mode is selected, the process proceeds to step S102, and if the moving image mode is selected, the process proceeds to step S103.

In step S102, since the still image mode is selected, the first imaging system 11 is operated for still image shooting, and a still image shooting operation using the SPAD type first image sensor 103 is started.

On the other hand, in step S103, since the moving image mode is selected, the second imaging system 12 is operated for moving image shooting, and a moving image shooting operation using the CMOS type second image sensor 123 is started.

In this way, by using the first imaging system 11 and the second imaging system 12 properly according to the still image mode and the moving image mode, still image shooting and moving image shooting can be performed while suppressing the total power consumption in the image capturing apparatus 1.

Next, in step S104, the controller 13 determines whether the recording operation in the selected mode is to be performed in response to user operation to the operation unit 14 or the like.

In the case where recording is to be performed, the process proceeds to step S105 where the image signal obtained by shooting in the mode determined in step S101 is recorded by the image recording unit 16, and the process proceeds to step S106. On the other hand, in a case where recording is not performed, the process directly shifts to step S106.

In step S106, it is determined by the controller 13 whether or not shooting is to be ended by user operation to the operation unit 14 or the like. If shooting is to be continued, the process returns to step S101, and if the shooting is to be ended, the process ends.

According to the first embodiment as described above, in the image capturing apparatus including the SPAR-type image sensor and the CMOS-type image sensor, it is possible to achieve both high image quality and power saving by performing shooting by switching between the image sensors in accordance with the case of performing the still image shooting and the case of performing the moving image shooting.

In the present embodiment, which of the first image sensor 103 (SPAD-type image sensor) or the second image sensor 123 (CMOS-type image sensor) is used is controlled by selecting the still image mode and the moving image mode, however, the present invention is not limited thereto. For example, the switching between the first image sensor 103 and the second image sensor 123 may be performed in accordance with the power consumption and the upper limit of the temperature allowed for the image capturing apparatus, and a shooting mode such as difference in moving image resolution, single shooting and continuous shooting, and so forth. That is, if a shooting mode for performing a high resolution moving image shooting is set, it is controlled to use the first image sensor 103 (SPAD type image sensor), and if a shooting mode for performing a low resolution moving image shooting is set, it is controlled to use the second image sensor 123 (CMOS type image sensor). Alternatively, if a single shooting mode is set, it is controlled to use the first image sensor 103 (SPAD type image sensor), and if a continuous shooting mode is set, it is controlled to use the second image sensor 123 (CMOS type image sensor).

Further, switching may be performed according to the shutter speed at the time of still image shooting and the frame rate at the time of moving image shooting. That is, if still image shooting is to be performed at a shutter speed higher than a predetermined shutter speed, it is controlled to use the first image sensor 103 (SPAD-type image sensor), and if still image shooting is to be performed at a shutter speed is equal to or lower than the predetermined shutter speed, it is controlled to use the second image sensor 123 (CMOS type image sensor). Furthermore, if the frame rate at the time of moving image shooting is larger than a predetermined frame rate, it is controlled to use the first image sensor 103 (SPAD type image sensor), and if the frame rate at the time of moving image shooting is equal to or less than the predetermined frame rate, it is controlled to use the second image sensor 123 (CMOS type image sensor).

Modification of First Embodiment

Figure 7:
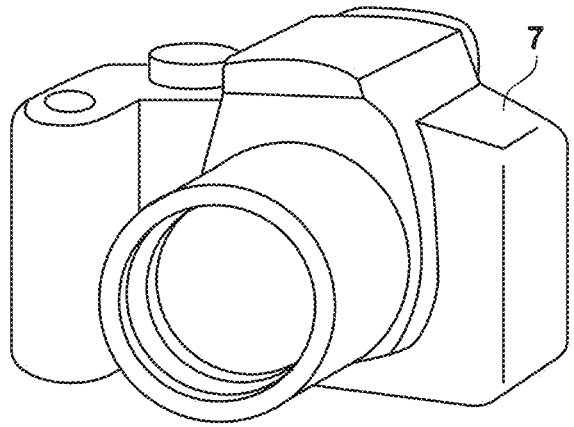
FIG. 7 is a view showing an example of an appearance of an image capturing apparatus according to a modification of the first embodiment.

FIG. 7 is a view showing an example of an appearance of an image capturing apparatus according to a modification of the first embodiment. The image capturing apparatus 1 shown in FIG. 1A has a configuration in which light from a subject is incident on two image sensors through two optical systems. On the other hand, in an image capturing apparatus 7 shown in FIG. 7, the light from the subject enters through one optical system, is reflected or divided by a light guiding member, such as a mirror, in the image capturing apparatus 7, and is incident on two image sensors.

Figure 8:
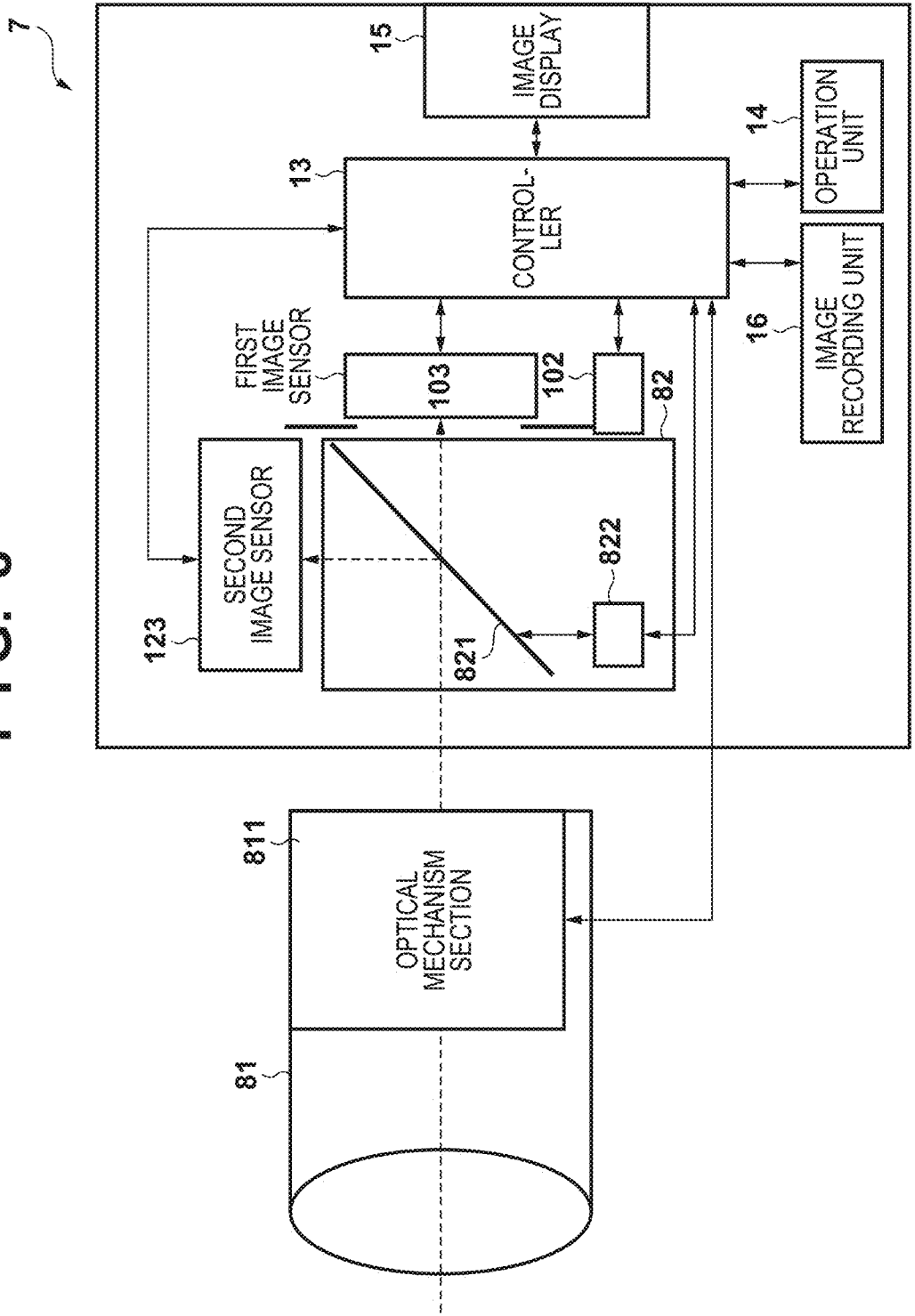
FIG. 8 is a block diagram showing a configuration of the image capturing apparatus according to the modification of the first embodiment.

FIG. 8 is a block diagram showing the configuration of the image capturing apparatus 7 shown in FIG. 7. In FIG. 8, the same constituents as those in FIG. 1A are referred to by the reference numerals, and a description thereof will be omitted.

As shown in FIG. 8, the image capturing apparatus 7 in this modification includes an optical lens barrel 81, a shutter mechanism 102, a first image sensor 103, a second image sensor 123, a controller 13, an operation unit 14, an image display 15, an image recording unit 16, and a mirror unit 82. In this modification, it will be described by assuming that a function of performing various signal processing upon receiving image signals from the first image sensor 103 and the second image sensor 123 and a function of compressing and expanding imaging data are inherent to the controller 13.

The optical lens barrel 81 includes a lens for converging light from a subject onto the first image sensor 103 or the second image sensor 123 configured in the image capturing apparatus 7, and an optical mechanism section 811. The optical mechanism section 811 is driven based on a control signal from the controller 13, and performs focus adjustment, changes the optical magnification, adjusts an amount of the incident light, and so forth.

The mirror unit 82 includes a mirror 821 and a mirror driving unit 822 and serves to guide light entering through the optical lens barrel 81 to the first image sensor 103 or the second image sensor 123.

The mirror driving unit 822 drives the mirror 821 by an actuator or the like in accordance with a control signal from the controller 13. That is, driving is performed so that the mirror 821 is at a first position (mirror down) on the optical axis of the lens shown in FIG. 8 or at a second position (mirror up) retracted from the optical axis by fliping up the mirror 821.

In a case where the mirror 821 is at the first position, the light from the optical lens barrel 81 is reflected to be incident on the second image sensor 123. On the other hand, in a case where the mirror 821 is in the second position, the light from the optical lens barrel 81 directly enters the first image sensor 103.

At this time, the configuration position of the mirror 821 is optically equivalent with respect to the imaging surfaces of the first image sensor 103 and the second image sensor 123. In other words, the first image sensor 103 disposed on a first imaging surface and the second image sensor 123 disposed on a second imaging surface are arranged in imaging planes which are optically conjugate to each other with respect to the subject via the optical lens barrel 81.

FIG. 9 is a flowchart for explaining an operation of the image capturing apparatus 7 having the configuration shown in FIG. 8. Note that, in FIG. 9, processes similarly to those in FIG. 6 are referred to by the same step numbers, and the explanation of those processes will be omitted as appropriate.

When shooting is started, in step S101, if the still image mode is selected, the process proceeds to step S901, and if the moving image mode is selected, the process proceeds to step S903.

If the still image mode is selected, the mirror 821 is driven to the second position (mirror-up position) in step S901 to direct the light from the optical lens barrel 81 to the first image sensor 103.

After driving the mirror 821 to the second position in step S901, the process transitions to step S902 to start a still image shooting operation using the SPAD type first image sensor 103, and the flow transitions to step S104.

On the other hand, if the moving image mode is selected, the mirror 821 is driven to the first position (mirror down position) in step S903, and the light from the optical lens barrel 81 is guided to the second image sensor 123.

After driving the mirror 821 to the first position in step S903, the process transitions to step S904 to start a moving image shooting operation using the CMOS type second image sensor 123, and the flow transitions to step S104.

The processes after step S104 are the same as the processes described above in FIG. 6, thus the description thereof is omitted.

According to the modification of the first embodiment as described above, in addition to the same effect as that of the first embodiment, the image capturing apparatus can be configured with a single optical system.

Note that the mirror 821 does not have to be a total reflection mirror, and a half mirror, for example, may be used to divide the luminous flux from the optical lens barrel 81 so that the divided luminous fluxes are simultaneously incident on the first image sensor 103 and the second image sensor 123. In that case, the same operation described with reference to FIG. 6 in the first embodiment can be performed with a configuration in which the mirror operation is unnecessary.

Second Embodiment

Next, a second embodiment of the present invention will be described. In the second embodiment of the present invention, the image capturing apparatus 1 described with reference to FIGS. 5A to 5B in the first embodiment, or the image capturing apparatus 7 described with reference to FIGS. 7 and 8 in the modification of the first embodiment may be used, thus the description thereof is omitted here.

In a case of using the image capturing apparatus 7, the second embodiment can be applied by using a half mirror instead of the total reflection mirror. The processing in the second embodiment will be described below with reference to FIGS. 10A to 12.

FIGS. 10A and 10B, and FIGS. 11A and 11B are diagrams for explaining the case where a count error occurs in a SPAD-type image sensor.

Figure 10A:
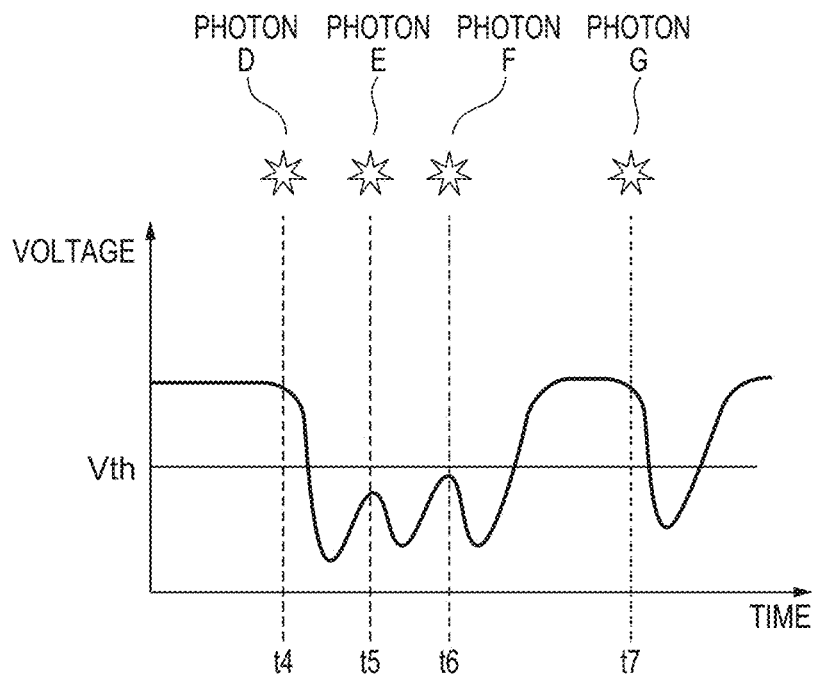
FIGS. 10A and 10B are diagrams for explaining count errors in a SPAD-type imaging device.

FIG. 10A is a schematic diagram showing the relationship between the pulse waveform of the output voltage by avalanche multiplication when photons are incident and a determination threshold value Vth, where the horizontal axis represents time. Unlike the waveform in the normal operation described in FIG. 4B, after a voltage changes over the determination threshold value Vth due to a photon D (time t4), before the avalanche multiplication in operation B described with reference to FIG. 4A stops, a photon E (time t5) enters. At this time, since the photon E enters at time t5 before the waveform due to avalanche multiplication occurring at time t4 does not exceed the determination threshold value Vth, the count operation for the photon E cannot be performed.

In addition, since the state at the time of incidence of a photon F (time t6) is the same as that at the time t4 to t5, the photon F is not counted similarly. As described above, in a case where the luminance of a subject is high, photons enter continuously before the waveform exceeds the determination threshold value Vth, so the count value becomes smaller than the number of photons actually incident, and count error (count saturation) occurs.

During a period from time t6 to time t7, no photon enters, and the voltage once exceeds the determination threshold value Vth, thus the pulse waveform of the voltage with respect to a photon G (time t7) incident thereafter is counted.

Figure 10B:
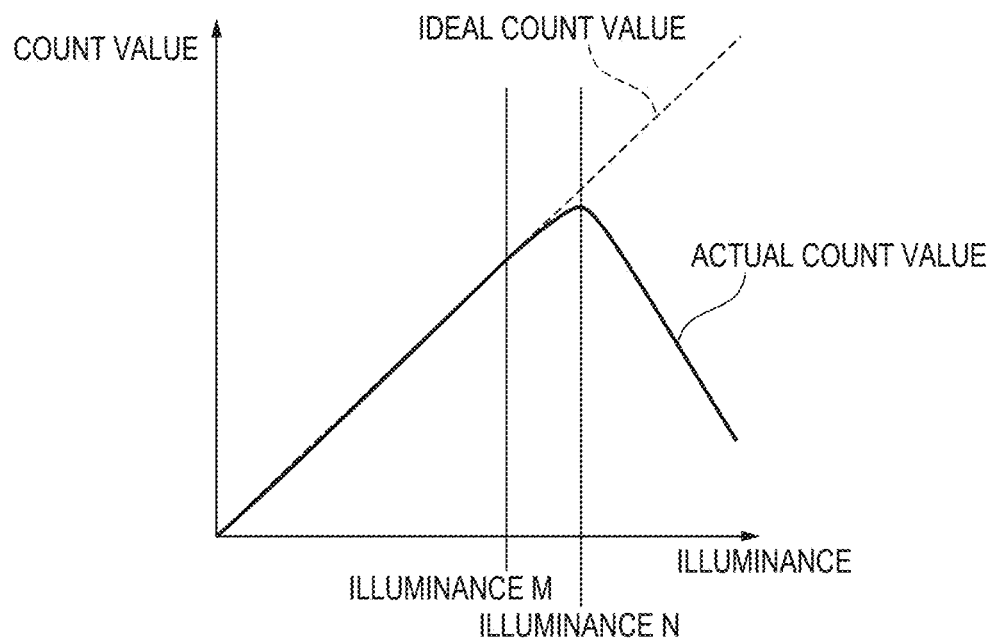

FIG. 10B is a view showing the relationship between illuminance and count values in the SPAR-type image sensor. As the illuminance increases, the number of photons increases, so the count value counted by the SPAD-type image sensor also increases proportionately. However, when the illuminance is M or more, the state from time t4 to time t6 in FIG. 10A occurs, which causes a count error (count saturation). When the illuminance further increases, the number of photons that simultaneously enter increases further, and the count error state continues, and the actual count value (solid line) becomes inversely proportional to the ideal count value (broken line) when the illuminance exceeds the illuminance N.

Figure 11A:
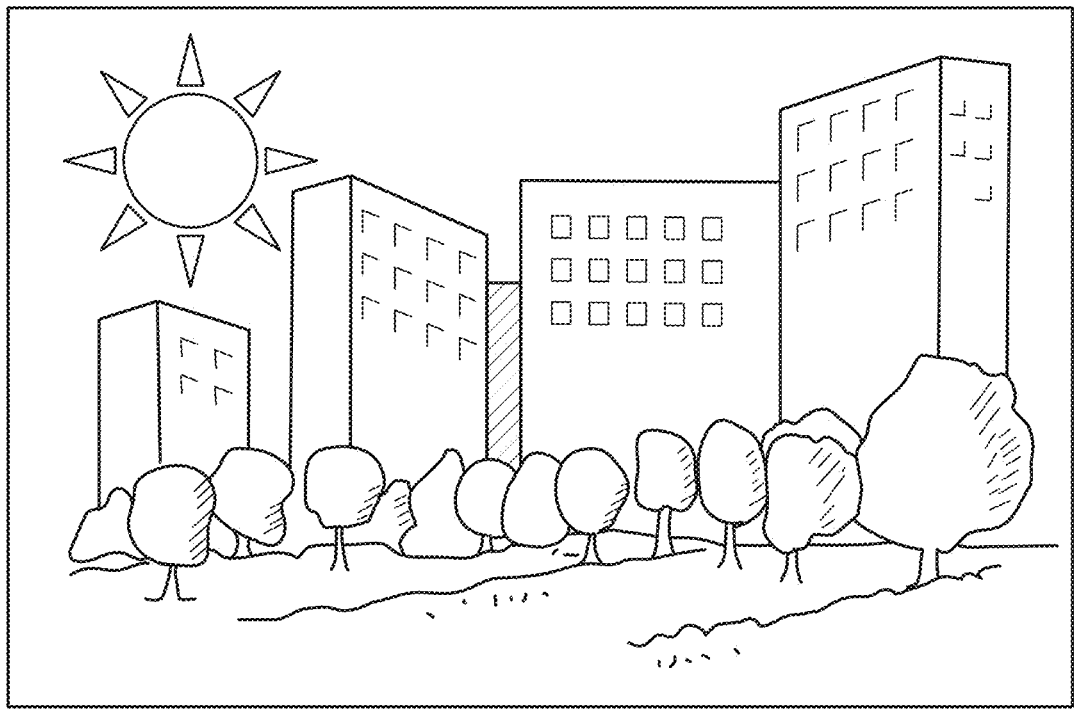
FIGS. 11A and 11B are diagrams showing an example of an image in which a count error has occurred in a SPAR type image sensor.
Figure 11B:
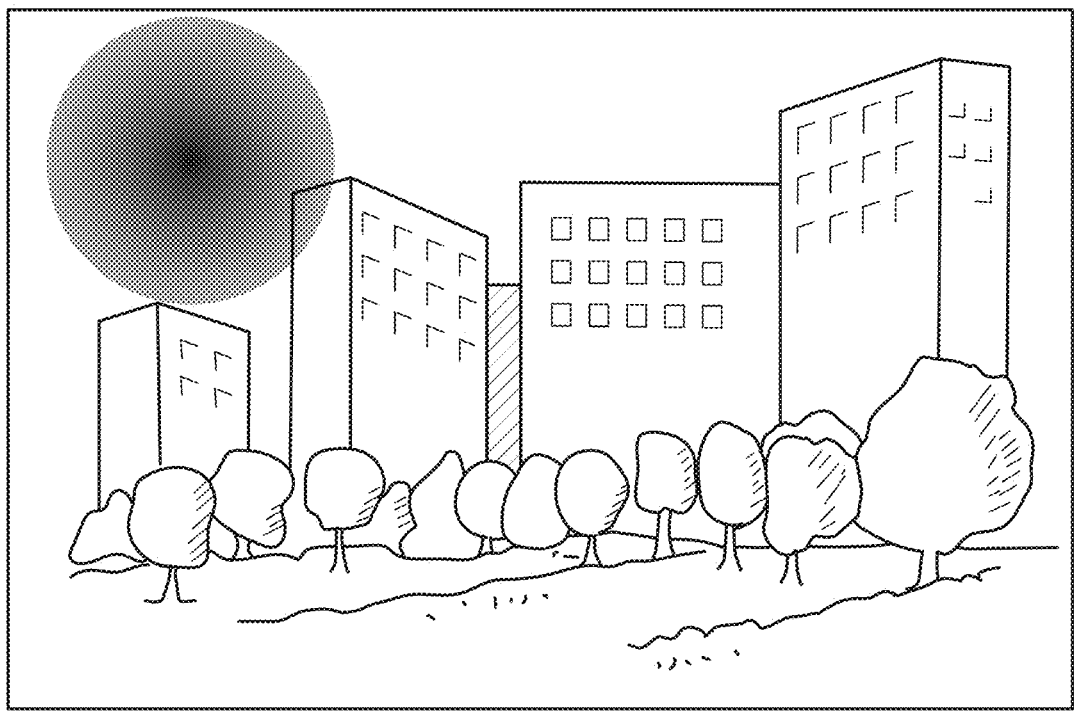

When the illuminance is equal to or greater than the illuminance M, if a scene including a high-brightness subject as shown in FIG. 11A is shot, the illuminance of the high-brightness subject causes an image in which a darkening occurs as shown in the gradation portion in FIG. 11B.

Accordingly, in the second embodiment, in the image obtained by the SPAD-type first image sensor 103, an image portion corresponding to the high-luminance subject in which the count error has occurred is interpolated by using an image obtained by the CMOS-type second image sensor 123 in accordance with the luminance of the subject.

An image shooting operation in the second embodiment will be described with reference to the flowchart in FIG. 12.

When the image capturing apparatus is powered on and shooting is started, the controller 13 first determines in step S201 whether shooting and recording are to be performed according to an instruction of shooting and recording by a user operation to the operation unit 14.

If it is determined in step S201 that shooting and recording are to be performed, shooting is performed using the first image sensor 103 in step S203, and shooting is performed using the second image sensor 123 in parallel, and images are acquired respectively. On the other hand, if shooting and recording are not to be performed, the process proceeds to step S209.

In the present embodiment, it is described that the first image sensor 103 and the second image sensor 123 perform image shooting in parallel, but images may be acquired separately in time sequence.

Next, in step S204, based on an area distribution of image signal values in the image acquired from the second image sensor 123 in step S203, an aperture setting value of the second optical mechanism section 122, and an exposure period and a sensitivity setting value of the second image sensor 123, luminance values of subjects are calculated by the second image signal processor 124 for each of the areas determined in advance.

Then, the luminance values of subjects are held in the controller 13 as correction determination values. The above-mentioned area may be set appropriately, for example, h detecting a subject/subjects using a known method and setting each subject as each area, or dividing an image into a plurality of blocks of a predetermined size.

Next, in step S205, the controller 13 determines whether at least one of the correction determination values of the respective areas obtained in step S204 is equal to or greater than a correction determination threshold value at which a count error occurs in the first image sensor 103. Then, if at least one of the correction determination values is equal to or greater than the correction determination threshold value, it is determined that the correction is necessary, and if all the correction determination values are less than the correction determination threshold value, it is determined that the correction is unnecessary. The correction determination threshold value is held in advance as a design value in the controller 13 based on, for example, the characteristics of the first image sensor 103 described with reference to FIG. 10B.

If it is determined in step S205 that the correction is unnecessary, the process proceeds to S206, and if it is determined that the correction is necessary, the process proceeds to step S207.

In step S206, since the correction is not necessary, the image obtained by the first image sensor 103 in step S202 is recorded as is by the image recording unit 16, and the process proceeds to step S209.

On the other hand, in step S207, it is determined in step S205 that the image obtained by the first image sensor 103 includes a pixel signal having a count error. Therefore, in the image obtained by the first image sensor 103, the controller 13 corrects image signals in addresses in the area whose correction determination value obtained in step S204 exceeds the correction determination threshold value by exchanging the image signals with the image signals in the same addresses obtained from the second image sensor 123. After the correction, the process proceeds to step S209.

The difference in signal level between the images obtained from the first image sensor 103 and the second image sensor 123 is, for example, obtained as a table or a function of the difference between the signal levels of the second image sensor 123 and the first image sensor 103 obtained for each luminance, and convert it. In addition, if the area in which the count error occurs in the image obtained by the first image sensor 103 is small, correction may be performed by interpolating the signal values in the pixel area in which the count error occurs using surrounding pixel signals in which the count error does not occur, or by replacing the signal values in the pixel area in which the count error occurs with a fixed value. Other various correction methods can be considered, and the present invention is not limited by the correction method.

In step S209, the controller 13 determines whether or not to end the shooting, and if yes, the process transitions to the standby state, and if not, the process returns to step S201 and the operation is continued.

In the above example, the subject luminance value is calculated for each region and used as the correction determination value which is compared with the correction determination threshold value, however, the present invention is not limited to this. For example, the signal value difference or the signal value ratio of the same address area between the images obtained by the first image sensor 103 and the second image sensor 123 may be used as the correction determination values. Alternatively, the determination may be made by comparing the maximum value, as a correction determination value, of the subject luminance values acquired for each area with the correction determination threshold value.

Also, the maximum luminance value in the image obtained from the second image sensor 123 may be compared as correction determination values with the correction determination threshold value, and if it is determined that correction is necessary, determination on the subject luminance value for each area may be performed. That is, the luminance value of the image obtained from the second image sensor 123 is used to determine whether there is a count error in the image obtained from the first image sensor 103 and the correction is performed as needed. Various other methods and procedures are conceivable.

According to the second embodiment as described above, it is possible to correct an image by detecting a count error caused by a high-brightness subject occurring in a case of using a SPAR-type image sensor, and thus it is possible to provide an image with good image quality.

Third Embodiment

Next, a third embodiment of the present invention will be described. In the third embodiment of the present invention, the image capturing apparatus 1 described with reference to FIGS. 1A to 5B in the first embodiment, or the image capturing apparatus 7 described with reference to FIGS. 7 and 8 in the modification of the first embodiment may be used, thus the description thereof is omitted here.

In a case of using the image capturing apparatus 7, the third embodiment can be applied by using a half mirror instead of the total reflection mirror. The processing in the third embodiment will be described below with reference to FIGS. 13 and 14.

In the third embodiment, an operation in which dynamic range expansion processing (hereinafter referred to as "HDR processing") is performed using image signals obtained from the SPAD type first image sensor 103 and the CMOS type second image sensor 123 will be described. In the present embodiment, it is assumed that the HDR processing is performed in the controller 13.

Figure 13:
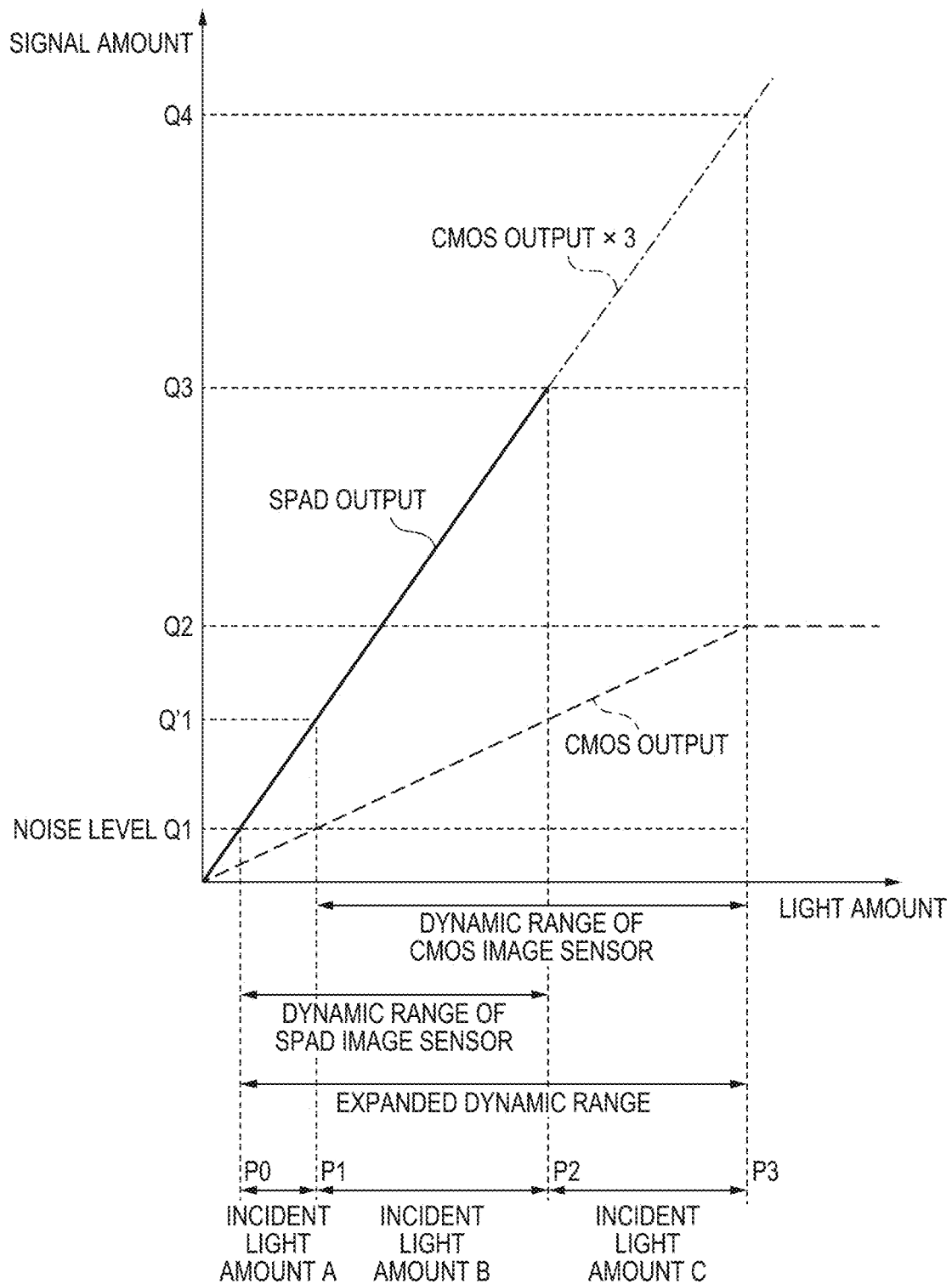
FIG. 13 is a diagram for explaining a dynamic range expansion process according to a third embodiment.

FIG. 13 is a diagram showing the relationship between the amount of incident light and the amount of signal in the HDR processing. In general, the HDR processing is processing for expanding the dynamic range of a signal using images acquired under image shooting conditions of low exposure and high exposure.

As described in the background of the invention and the description of the second embodiment, the SPAD-type imaging device has an advantage of high S/N ratio because the RTD noise does not occur, for example, however, a count error tends to occur on the high luminance side.

Therefore, in the HDR processing in the third embodiment, the dynamic range is expanded using an image signal from the CMOS type image sensor in the signal range where the amount of incident light is large, and using an image signal from the SPAD type image sensor capable of obtaining an image signal with a high S/N ratio in the low luminance side where the amount of incident light is small.

In the SPAD type first image sensor 103, when the incident light amount reaches P2, the signal amount Q3 where the count error starts to occur is reached, and in the CMOS type second image sensor 123, the saturation signal amount Q2 of the CMOS type image sensor is reached when the incident light amount becomes P3. On the other hand, in a case where the signal amount obtained by light reception is Q1 or less, the pixel signal cannot be used because it corresponds to the noise level.

Therefore, the dynamic range of the first image sensor 103 is in the range from P0 to P2 of the amount of incident light, and the dynamic range of the second image sensor 123 is in the range from P1 to P3 of the amount of incident light.

Here, it is assumed that the ratio of the signal amounts of the first image sensor 103 and the second image sensor 123 is 3:1. In this case, the controller 13 obtains the pixel signal HDL_A after the HDR processing by the following equation (1) for the signal amount in the range of the incident light amount A (light amounts P0 to P1, low level) for a pixel in the imaging screen.

pixel signal HDL_A=pixel signal of first image sensor×1+pixel signal of second image sensor×0  (1)

Further, the controller 13 obtains the pixel signal HDL_B after the HDR processing by the following equation (2) for the signal amount in the range of the incident light amount B (light amount P1 to P2, middle level) for a certain pixel in the imaging screen.

pixel signal HDL_B=pixel signal of first image sensor×(1−α)+pixel signal of second image sensor×α×3  (2)

Furthermore, the controller 13 obtains a pixel signal HDL_C after the HDR processing according to the following equation (3) for the signal amount in the range of the incident light amount C (light amount P2 to P3, high level) for a certain pixel in the imaging screen.

pixel signal HDL_C=pixel signal of first image sensor×0+pixel signal of second image sensor×3  (3)

As described above, the controller 13 classifies the signal amount of each pixel in the imaging screen into, for example, three levels of low level, middle level, and high level. Then, for the pixel signal corresponding to the incident light amount that cause a low level of signal amount, the pixel signal after the HDR processing is obtained by the equation (1) which uses only the pixel signal of the first image sensor 103.

In addition, for a pixel signal corresponding to an incident light amount that causes a medium level of signal amount, the controller 13 combines the pixel signal of the first image sensor 103 and the pixel signal of the second image sensor 123 at a ratio of (1−α):α using the equation (2) to obtain the pixel signal after the HDR processing is obtained. Here, α(α is 0 or more and 1 or less) represents a synthesis ratio. Furthermore, for a pixel signal corresponds to an incident light amount that causes a high level of signal amount, the controller 13 obtains the pixel signal after the HDR processing using the equation (3) which uses only the pixel signal of the second image sensor 123.

As a result, as shown in FIG. 13, it is possible to generate a high dynamic range image in which the signal amount is expanded from Q1 to Q4. The low level, medium level, and high level sections of the signal amount level are determined in advance according to the characteristics of the first image sensor 103 and the second image sensor 123.

Figure 14:
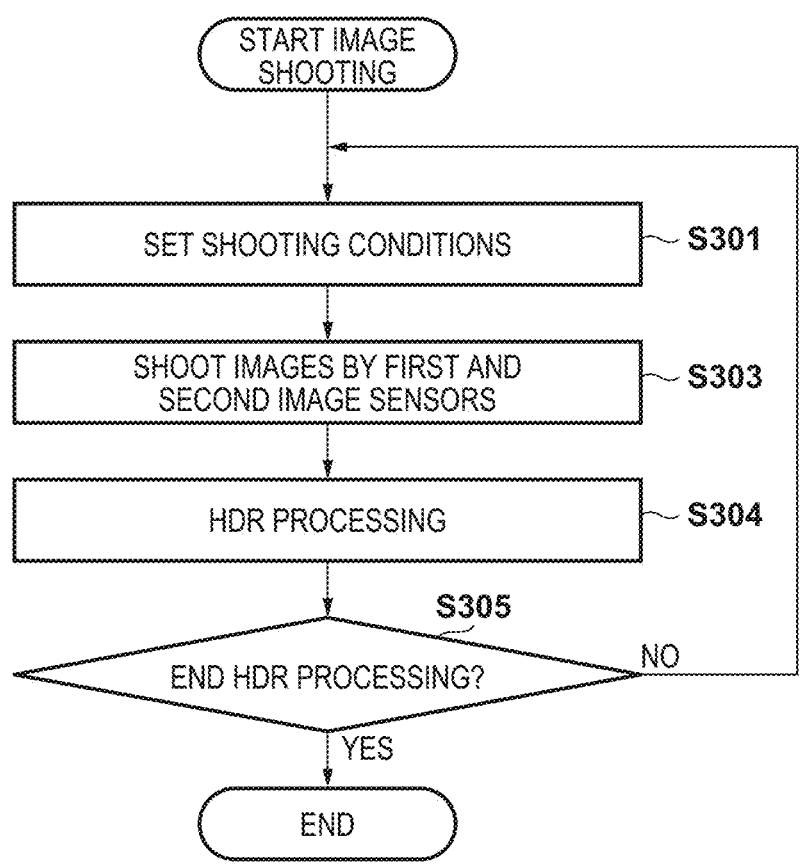
FIG. 14 is a flowchart for explaining an image shooting operation according to the third embodiment.

Next, the HDR processing in the imaging device of the third embodiment will be described with reference to the flowchart in FIG. 14.

When the shooting is started after the HDR mode is selected by the user operation, predetermined shooting conditions are set for the first image sensor 103 and the second image sensor 123 in step S301.

Next, in step S303, shooting is performed using the first image sensor 103, and shooting is performed in parallel using the second image sensor 123, and images are acquired respectively. In the present embodiment, it is described that the first image sensor 103 and the second image sensor 123 perform image shooting in parallel, but images may be acquired separately in time sequence.

Next, in step S304, the controller 13 performs the above-described HDR processing using the images from the first image sensor 103 and the second image sensor 123 obtained in step S303.

Next, in step S305, it is determined whether or not the HDR processing is to be ended, and if it is to be ended, the transition to the standby state is made. On the other hand, when the shooting is to be continued, the process returns to step S301 to continue the shooting.

In the present embodiment, although an imaging apparatus having a two-image-sensor configuration in which a SPAD-type image sensor and a CMOS-type image sensor are separately configured is described, the present invention is not limited to this. For example, SPAD-type imaging pixels and CMOS-type imaging pixels are alternately arranged as a single-image-sensor configuration, and HDR processing may be performed using image signals obtained from rows of SPAD-type imaging pixels and rows of CMOS-type imaging pixels, which are physically adjacent to each other. At this time, the SPAD type imaging pixels and the CMOS type imaging pixels may be alternately formed row by row or for every multiple rows, or may be alternately formed column by column or for every multiple columns, or may be formed in a checkered pattern.

In the example described above, although the pixel signal after the HDR processing is acquired using one of the formulas (1) to (3) according to the incident light amount, the present invention is not limited to this, and which one of the equations (1) to (3) is to be used may be determined according to the signal amount. In that case, for example, the low level, the middle level, or the high level is determined based on the signal amount obtained from the first image sensor 103 and the signal amount obtained from the second image sensor 123, and one of formulas (1) to (3) is used based on the determination result.

According to the third embodiment as described above, by performing the HDR processing as described above using the SPAD-type image sensor and the CMOS-type image sensor, it is possible to obtain an image of a dynamic range suitable for the luminance of the subject.

Fourth Embodiment

Figure 15:
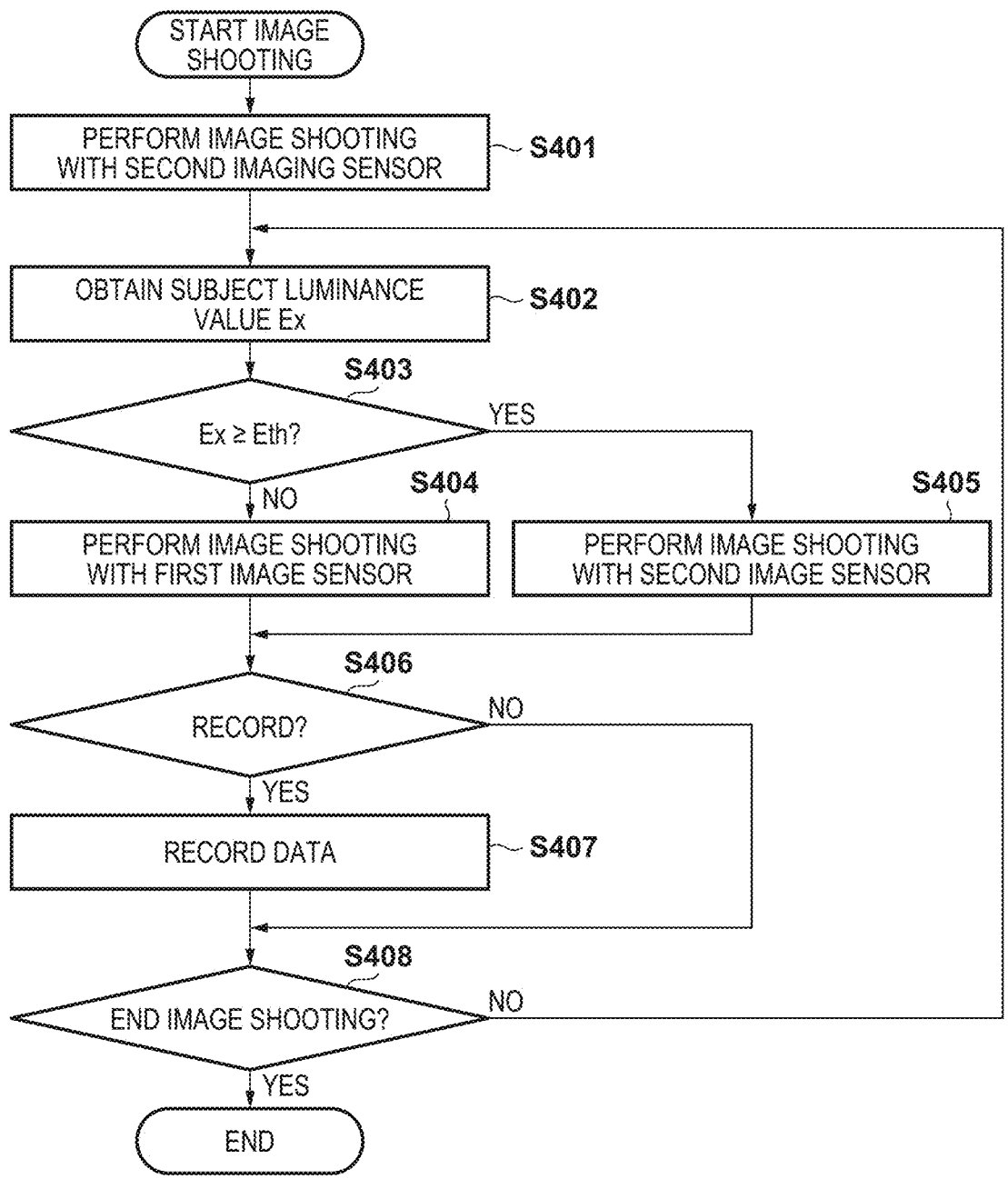
FIG. 15 is a flowchart for explaining an image shooting operation according to a fourth embodiment.

Next, a fourth embodiment of the present invention will be described. In the fourth embodiment of the present invention, the image capturing apparatus 1 described with reference to FIGS. 1A to 5B in the first embodiment, or the image capturing apparatus 7 described with reference to FIGS. 7 and 8 in the modification of the first embodiment may be used, thus the description thereof is omitted here. The processing in the fourth embodiment will be described below with reference to FIG. 15.

In the fourth embodiment, image shooting is performed by switching between a SPAD-type image sensor and a CMOS-type image sensor according to a sensitivity setting in shooting conditions. The configuration of the pixel 203 of the SPAD type first image sensor 103 described with reference to FIGS. 3A and 3B does not need the reset transistor M55 and the amplification transistor M53 in the configuration of the pixel 501 of the CMOS second image sensor 123 described with reference to FIGS. 5A and 5B.

Therefore, kTC noise and RTS noise due to these configurations do not occur, so the S/N ratio of the SPAD type image sensor is superior to that of the CMOS type image sensor. However, as described with reference to FIGS. 10A and 10B in the second embodiment, a count error occurs under the condition that many photons are incident within a predetermined period of time.

In consideration of above, in the image capturing apparatus according to the fourth embodiment, image shooting is performed using the CMOS image sensor under the exposure condition in which a large amount of photons are incident on pixels, and image shooting is performed using the SPAD-type image sensor under the exposure condition for low illumination since a large amount of noise tends to be generated.

First, when the imaging apparatus is powered on and image shooting is started, in step S401, an imaging operation by the second image sensor 123 is performed in order to determine an exposure value. In step S401, since the condition regarding the brightness of the subject is not known immediately after the start of shooting, the image is acquired by the CMOS type second image sensor 123 which does not cause a problem with high brightness subject.

Next, in step S402, a subject luminance value Ex is obtained from the image obtained in step S401. In the present embodiment, the subject luminance value Ex is calculated based on the image signal acquired by the second image sensor 123, the exposure time and sensitivity setting value set in the second image sensor 123, and the optical aperture setting value in the second optical mechanism section 122.

In step S402, in a case where the calculation is performed based on the image signal from the second image sensor 123, the calculation is done by the second image signal processor 124. However, in a case where the process moves from step S408 which will be described later to step S402 and the calculation is to be performed based on the image signal from the first image sensor 103, the calculation is performed by first image signal processor 115.

Next, in step S403, the controller 13 determines whether the subject luminance value Ex calculated in step S402 is equal to or greater than a predetermined threshold value Eth. Here, as the threshold value Eth, the brightness at which the SPAD type first image sensor 103 causes a count error, or the brightness at which the S/N ratio of the CMOS type second image sensor 123 exceeds the allowable value is set.

If the subject luminance value Ex is less than the threshold value Eth in step S403, the process proceeds to step S404, and shooting is performed using the SPAD type first image sensor 103. On the other hand, if the subject luminance value Ex is equal to or greater than the threshold value Eth in step S403, the controller 13 transitions to step S405, and shooting is performed using the CMOS type second image sensor 123.

In step S406, the controller 13 determines whether the recording operation is to be performed based on a user operation to the operation unit 14 or the like. If recording is to be performed, the process proceeds to S407, the image signal obtained by the shooting in step S404 or S405 is recorded by the image recording unit 16, and the process proceeds to step S408. On the other hand, if recording is not to be performed, the process directly proceeds to step S408.

In step S408, the controller 13 determines whether or not to end the image shooting based on the user operation to the operation unit 14 or the like, and the controller 13 returns the process to step S402 if continuing the shooting, and ends the process if ending the shooting.

When transitioning the process from step S408 to step S402, the subject luminance value Ex is obtained from the image signal recorded in step S407. Therefore, in a case of using the image signal obtained in step S404 from the first image sensor 103, the subject luminance value Ex is caluculated by the first image signal processor 115 as described above.

In the above-described example, the subject luminance value Ex is obtained in step S402 and the imaging operation is switched based on the subject luminance value Ex in step S403. However, switching may be performed according to shooting conditions such as sensitivity set in the image sensor. The imaging condition settings in that case may be determined by the controller 13 based on an image signal or a photometric value calculated using an external measurement element such as a photometric sensor (not shown), or may be determined by the user's operation. Then, control may be done such that in a case where the sensitivity is larger than a predetermined sensitivity, the process proceeds to step S404, and in a case where the sensitivity is equal to or less than the sensitivity threshold, the process proceeds to step S405.

Furthermore, the image sensor to be used may be switched according to the aperture value set in accordance with the depth of field, shutter speed, etc., the presence or absence of an ND filter for adjusting the amount of incident light, or the density of the inserted ND filter. That is, if the f-stop number narrower than a predetermined f-number is set, control is performed so as to use the first image sensor 103 (SPAD-type image sensor), and if the f-stop number wider than the predetermined f-number is set, control is performed so as to use the second image sensor 123 (CMOS type image sensor).

In addition, in a case where an ND filter is inserted in the light path, control is performed to use the first image sensor 103 (SPAD type image sensor), and in a case where an ND filter is not inserted in the light path, control is performed to use the second image sensor 123 (CMOS image sensor) Alternatively, in a case where an ND filter with a density higher than a predetermined density is inserted in the light path control is performed to use the first image sensor 103 (SPAD type image sensor), and in a case where an ND filter with a density lower than the predetermined density is inserted, control is performed to use the second image sensor 123 (CMOS image sensor).

According to the fourth embodiment as described above, it is possible to provide an image with good image quality by avoiding image deterioration caused by high luminance sinking due to count error in the SPAD type image sensor and deterioration in S/N ratio in the CMOS type imaging device.

Other Embodiment

The present invention may be applied to a system constituted by a plurality of devices or to an apparatus comprising a single device.

The present invention may be applied to a system constituted by a plurality of devices or to an apparatus comprising a single device.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-149678, filed on Aug. 8, 2018 and No. 2019-119015, filed on Jun. 26, 2019, which are hereby incorporated by reference herein in their entirety.

What is claimed is:

1. An image capturing apparatus comprising:
   a first image sensor having a plurality of pixels each counts a number of entering photons and outputs a count value as a first image signal;
   a second image sensor having a plurality of pixels each outputs an electric signal corresponding to a charge amount obtained by performing photoelectric conversion on entering light as a second image signal;
   at least one processor programmed to perform operations of an obtaining unit that obtains a luminance value; and
   a generator that expands a dynamic range of an image using the first image signal and the second image signal,
   wherein the generator performs processing of
      selecting the first image signal in a case where the luminance value is less than a predetermined first threshold value,
      selecting and synthesizing the first and second image signals in a case where the luminance value is equal to or greater than the predetermined first threshold value and less than a predetermined second threshold value which is larger than the predetermined first threshold value, and
      selecting the second image signal and adjusting its sensitivity in a case where the luminance value is equal to or greater than the predetermined second threshold value.

2. The image capturing apparatus according to claim 1 further comprising a light guide that splits light entering through an imaging optical system to the first image sensor and the second image sensor.

3. The image capturing apparatus according to claim 1 wherein the obtaining unit that obtains the luminance value for each pixel.

4. The image capturing apparatus according to claim 3 further comprising:
   a first imaging optical system that guides light toward the first image sensor; and
   a second imaging optical system, different from the first imaging optical system, that guides light toward the second image sensor.

5. The image capturing apparatus according to claim 4, wherein in a case where the generator selects the first image signal, the first imaging optical system is used to guide light toward the first image sensor, and in a case where the generator selects the second image signal, the second imaging optical system is used to guide light toward the second image sensor.

6. The image capturing apparatus according to claim 3 further comprising a light guide that causes light entering through an imaging optical system to enter either of the first image sensor or the second image sensor,
   the light guide is controlled such that, in a case where the generator selects the first image signal, light is guided toward the first image sensor, and in a case where the generator selects the second image signal, light is guided toward the second image sensor.

* * * * *